(12) United States Patent
Wang et al.

(10) Patent No.: US 8,570,774 B2
(45) Date of Patent: Oct. 29, 2013

(54) ELECTRICAL POWER SYSTEM WITH HIGH-DENSITY PULSE WIDTH MODULATED (PWM) RECTIFIER

(76) Inventors: Ruxi Wang, Blacksburg, VA (US); Fred Wang, Blacksburg, VA (US); Rolando Burgos, Cary, NC (US); Dushan Boroyevich, Blacksburg, VA (US); Kaushik Rajashekara, Carmel, IN (US); Stephen A. Long, Carmel, IN (US)

( * ) Notice: Subject to any disclaimer, the term of this patent is extended or adjusted under 35 U.S.C. 154(b) by 751 days.

(21) Appl. No.: 12/511,859

(22) Filed: Jul. 29, 2009

(65) Prior Publication Data

US 2010/0027304 A1   Feb. 4, 2010

Related U.S. Application Data

(60) Provisional application No. 61/137,430, filed on Jul. 30, 2008.

(51) Int. Cl.
*H02M 1/12*   (2006.01)

(52) U.S. Cl.
USPC .............................................. 363/39; 363/44

(58) Field of Classification Search
USPC ............................. 363/39, 44–48, 53, 88, 127
See application file for complete search history.

(56) References Cited

U.S. PATENT DOCUMENTS

| | | | |
|---|---|---|---|
| 3,628,057 A | | 12/1971 | Mueller |
| 3,825,814 A | * | 7/1974 | Pelly .............................. 363/39 |
| 3,825,815 A | * | 7/1974 | Gyugyi et al. ................ 307/105 |
| 5,218,520 A | * | 6/1993 | Rozman et al. ................. 363/39 |
| 5,570,006 A | * | 10/1996 | Woodworth ................... 323/208 |
| 5,668,707 A | * | 9/1997 | Barrett ............................. 363/44 |
| 6,239,992 B1 | * | 5/2001 | Hamaoka et al. ............... 363/46 |
| 6,424,207 B1 | | 7/2002 | Johnson |
| 6,757,185 B2 | * | 6/2004 | Rojas Romero ................ 363/89 |
| 7,157,886 B2 | * | 1/2007 | Agarwal et al. ............... 323/207 |
| 7,327,113 B2 | * | 2/2008 | Steigerwald et al. .......... 318/599 |
| 7,436,684 B2 | * | 10/2008 | Dermark ......................... 363/17 |
| 2007/0216343 A1 | * | 9/2007 | Rozman et al. ............... 318/811 |

OTHER PUBLICATIONS

International Searching Authority, US, PCT/US2009/052153, International Search Report and Written Opinion, Oct. 15, 2009, Rolls-Royce Corporation.

Casanellas, Losses in PWM Inverters Using IGBTs, IEE Proc.-Electr. Power Appl., vol. 141, No. 5, Sep. 1994.

Dixon, Jr., High Power Factor Preregulator for Off-Line Power Supplies, Topic 6, Unitrode Corporation, Copyright 2003, Texas Instruments Incorporated.

(Continued)

*Primary Examiner* — Jessica Han
(74) *Attorney, Agent, or Firm* — Krieg DeVault LLP

(57) ABSTRACT

An electrical power system includes an alternating current (AC) power source configured to output an AC signal, a single phase pulse-width modulated (PWM) rectifier coupled to the AC power source and to an electrical load; a DC link capacitor coupled in parallel to the load and the PWM rectifier; and an active ripple energy storage circuit. The active ripple energy storage circuit has a first terminal, a second terminal and a third terminal, the active ripple energy storage circuit being coupled in parallel to the electrical load, the PWM rectifier and the DC link capacitor via the first terminal and the second terminal, the third terminal being coupled to the second terminal, the active ripple energy storage circuit being configured to selectively absorb and discharge at least part of the ripple energy.

30 Claims, 4 Drawing Sheets

(56) References Cited

OTHER PUBLICATIONS

Jiang, Development of Advanced Power Factor Correction Techniques, Ph.D. Dissertation, Virginia Power Electronics Center, Virginia Polytechnic Institute and State University.

Jiang et al, Single-Stage Single-Phase Parallel Power Factor Correction Scheme, Virginia Power Electronics Center, Virginia Polytechnic Institute and State University, Copyright 1994 IEEE.

Kolar et al, PWM Converter Power Density Barriers, ETH Zurich, Power Electronic Systems Laboratory, Vienna University of Technology, Power Electronics Section, Copyright 2007 IEEE.

Muljadi et al, Investigation of Self-Excited Induction Generators for Wind Turbine Applications, IEEE Industry Applications Society Annual Meeting, Oct. 3-7, 1999.

Ninomiya et al, Line-Harmonics Reduction Techniques for Consumer Electronics and Low-Power Electronic Equipment, Dept. of EESE, Kyushu University, Copyright 2000 IEEE.

Shimizu et al, A Unity Power Factor PWM Rectifier with DC Ripple Compensation, IEEE Transactions on Industrial Electronics, vol. 44, No. 4, Aug. 1997, Copyright 1997 IEEE.

Shimizu et al, DC Ripple Current Reduction on a Single-Phase PWM Voltage-Source Rectifier, IEEE Transactions on Industry Applications, vol. 36, No. 5, Sep./Oct. 2000, Copyright 2000 IEEE.

Tsuno et al, Optimization of the DC Ripple Energy Compensating Circuit on a Single-phase Voltage Source PWM Rectifier, 35th Annual IEEE Power Electronics Specialists Conference 2004, Copyright 2004 IEEE.

Xing, Modeling, Analysis, and Design of Distributed Power Electronics System Based on Building Block Concept, Ph.D. Dissertation, Virginia Polytechnic Institute and State University, Blacksburg, Virginia May 1999.

Supplementary European Search Report, EP 09 80 3562, Rolls-Royce Corporation, et al., Oct. 22, 2012.

* cited by examiner

ELECTRICAL POWER SYSTEM WITH HIGH-DENSITY PULSE WIDTH MODULATED (PWM) RECTIFIER

CROSS REFERENCE TO RELATED APPLICATIONS

The present application claims benefit of U.S. Provisional Patent Application No. 61/137,430 filed Jul. 30, 2008, entitled ELECTRICAL POWER SYSTEM WITH HIGH-DENSITY PULSE WIDTH MODULATED (PWM) RECTIFIER, which is incorporated herein by reference.

FIELD OF THE INVENTION

The present invention relates to converting alternating current (AC) power to direct current (DC) power to operate an electrical load, and, more particularly, to a high-density pulse width modulated (PWM) rectifier.

BACKGROUND

A characteristic of a typical single-phase pulse width modulated (PWM) rectifier is the formation of ripple power on the direct current (DC) link, e.g., where the alternating current (AC) input voltage and current are sinusoidal. The ripple power is generally twice the AC input frequency and can therefore cause low frequency DC ripple voltage on the DC bus. Although various schemes to reduce or eliminate the ripple component have been proposed, most such schemes adversely affect the power density of the rectifier system.

What is needed in the art is a system configured to absorb the ripple energy, but with a reduced power density relative to previous systems.

SUMMARY

The present invention provides a single phase PWM rectifier for providing power to a direct current (DC) load that may have an increased power density relative to previous systems. The power density may be increased by employing an auxiliary storage circuit in conjunction with the DC link capacitor. In one embodiment, the auxiliary storage circuit may include an auxiliary capacitor as a storage device that operates across a larger voltage range than does the DC link capacitor. This auxiliary storage device may operate across a larger voltage range because it is not limited by the voltage requirements for the DC bus. Because the auxiliary storage device may operate across a larger voltage range, it may be more efficient at storing the ripple energy, and hence may have a smaller volume than a DC link capacitor that may be otherwise used to store the ripple energy, which may thus increase the power density of the rectifier system.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
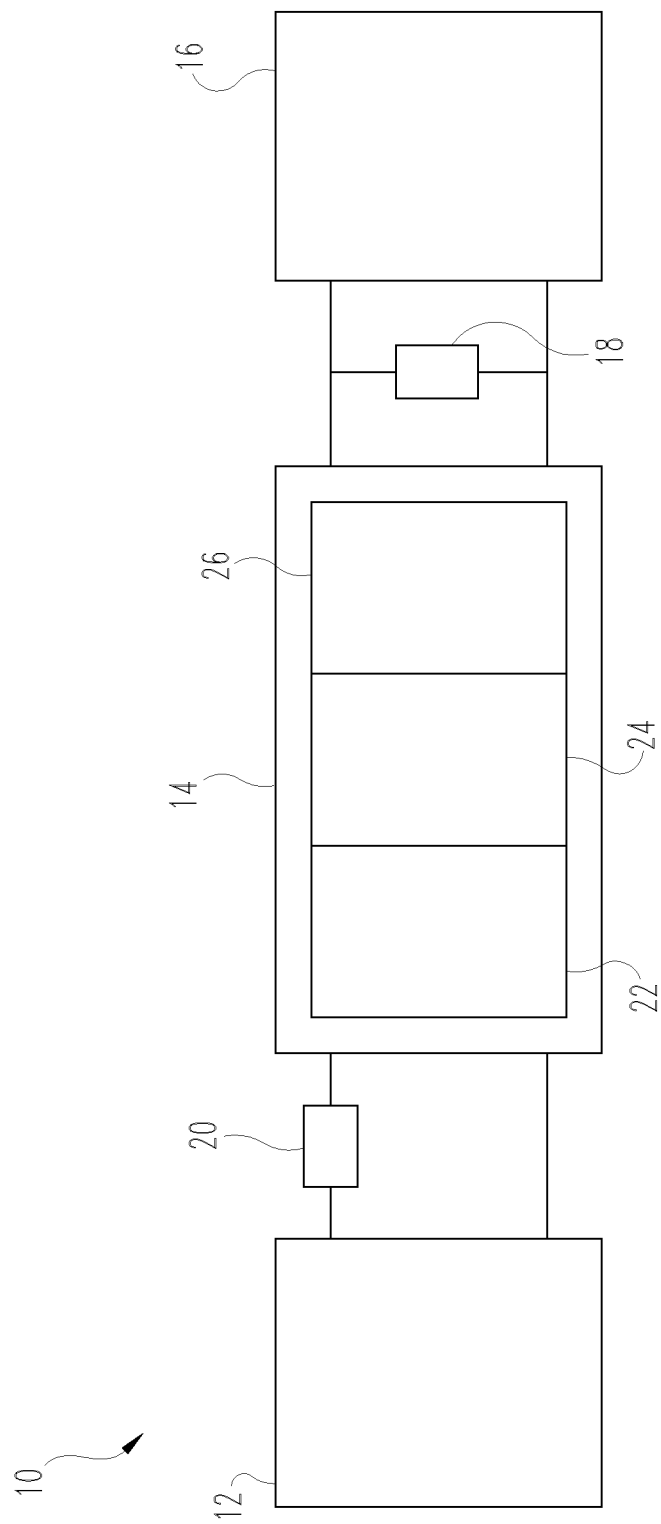
FIG. 1 schematically depicts an electrical power system for providing power to an electrical load in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and described herein, as would normally occur to one skilled in the art to which the invention pertains, are contemplated as being within the scope of the present invention.

Referring now to the drawings, and particularly to FIG. 1, there is schematically shown a non-limiting embodiment of an electrical power system 10 in accordance with the present invention. Electrical power system 10 includes an alternating current (AC) power source 12, a single phase pulse-width modulated (PWM) rectifier 14 and a direct current (DC) load 16 operating from a DC bus (DCB). Electrical power system 10 also includes a DC link capacitor 18 and an input inductor 20. In one form, input inductor 20 is a discreet inductor, although it is alternatively considered that in other embodiments, input inductor 20 may represent the inductance of the power source 12, e.g., in the form of a generator. In one form PWM rectifier 14 includes a single phase primary PWM rectifier circuit 22, and an active ripple energy storage circuit 24 having a PWM control circuit 26. Active ripple energy storage circuit 24 is referred to herein as "active" because it is not a passive circuit, but rather, is actively controlled to perform its ripple energy storage/filtering functions.

Figure 2:
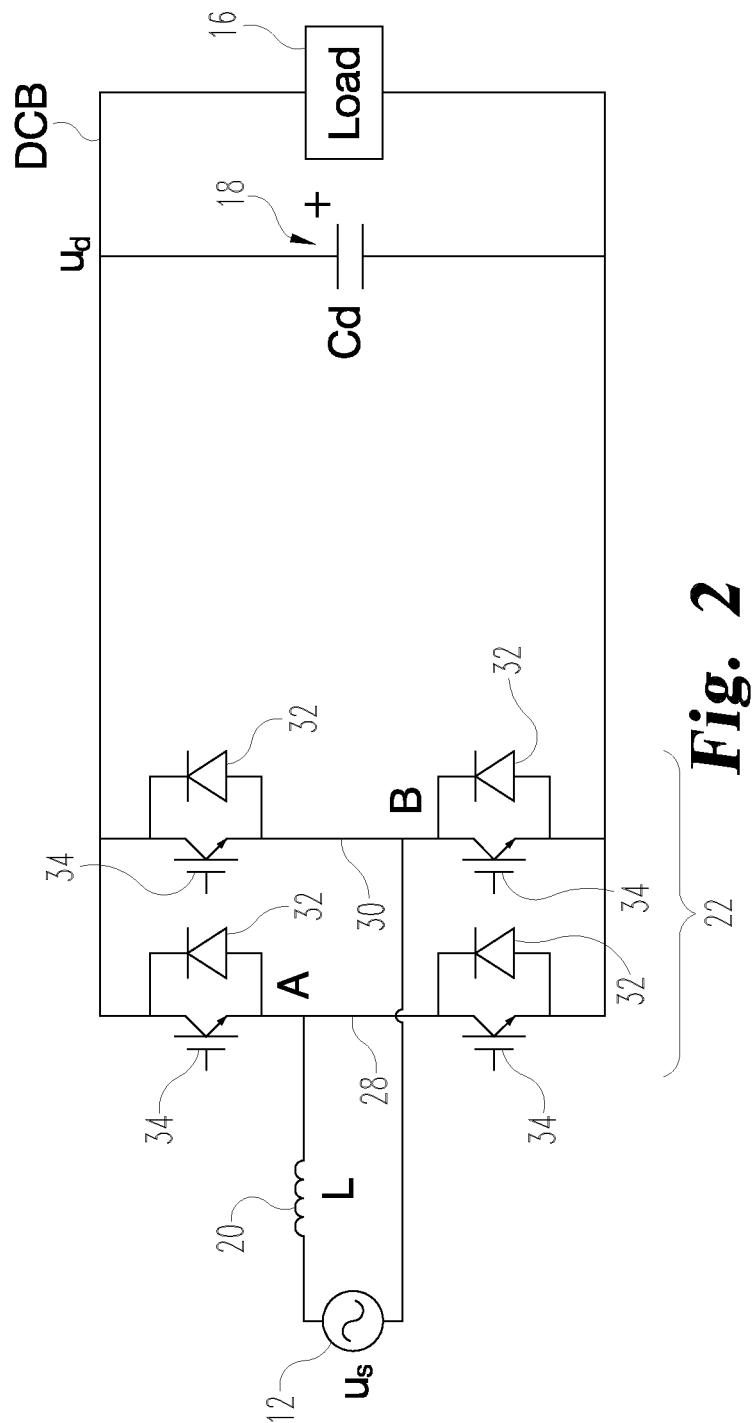
FIG. 2 is a schematic view depicting an alternating current (AC) power source and a pulse-width modulated (PWM) rectifier circuit employed in conjunction with the embodiment of FIG. 1.

Referring now to FIG. 2, primary PWM rectifier circuit 22 is described in greater detail. In one form, primary PWM rectifier circuit 22 is configured as an H-bridge rectifier. It will be understood that other rectifier configurations may be employed in other embodiments of the present invention. Primary PWM rectifier circuit 22 may include a first branch 28 coupled to input conductor 20, and a second branch 30 coupled to AC power source 12. Each of branches 28 and 30 may include a plurality of diodes 32 and semiconductor switches 34, such as IGBTs (insulated gate bipolar transistors). As depicted in FIG. 2, primary PWM rectifier circuit 22 may be coupled in parallel with electrical load 16. In addition, DC link capacitor 18 may be coupled in parallel with primary PWM rectifier circuit 22 and with electrical load 16. Primary PWM rectifier circuit 22 may be controlled in a known manner by a primary PWM control circuit (not shown).

AC power source 12 is configured to generate an AC power signal for subsequent conversion to a DC power signal for use by electrical load 16. PWM rectifier 14 is configured to receive the AC signal from AC power source 12, and to rectify the AC signal into a DC signal configured to operate the electrical load. The DC signal output by PWM rectifier circuit 22 may include a ripple component which has an amount of ripple energy given by the peak to peak voltage amplitude, current, and frequency of the ripple component. The ripple component pertains a current/voltage, the magnitude of which varies relative to the DC output sought at one or more frequencies. The ripple power ultimately results from the approximately sinusoidal output AC power source 12 caused by the single phase PWM rectifier circuit 22, and is approximately twice the AC input frequency, resulting in a low frequency DC ripple voltage in the output of PWM rectifier circuit 22.

In many cases it is desirable to provide DC power to the load with as little variation over time as possible, and hence, it may be preferable to eliminate or reduce the ripple component output by PWM rectifier 14. Although it is possible to employ DC link capacitor 18 to filter the low frequency ripple energy, doing so may require a large number of electrolytic bulk capacitors due to the fact that they must operate within the limited allowable electrical load voltage range centered approximately at the elevated electrical load voltage, and hence take up a lot of space and adversely impact the power density of a single-phase rectifier. Thus, the use of one or more large DC-link capacitors to filter the low frequency ripple energy is inefficient from the power density perspective, and is undesirable. For example, in situations where the power density of the single phase rectifier converter system is of concern, the use of one or more large DC-link capacitors may result in an undesirable low power density.

Further, not only do bulk DC-link capacitors result in large converter volume and lower power density, but also, the use of a large number of electrolytic bulk capacitors is known to adversely affect the life cycle and reliability of the power conversion system. Still further, the ripple current causes heating of the DC link capacitor, which may reduce the capacitor's life. Thus, it is desirable to reduce or avoid the use of the DC link capacitor (e.g., an aluminum electrolytic DC link capacity), i.e., DC link capacitor 18, for purposes of filtering ripple energy. Accordingly, in embodiments of the present invention, active ripple energy storage circuit 24 is employed to filter the ripple energy.

Figure 3:
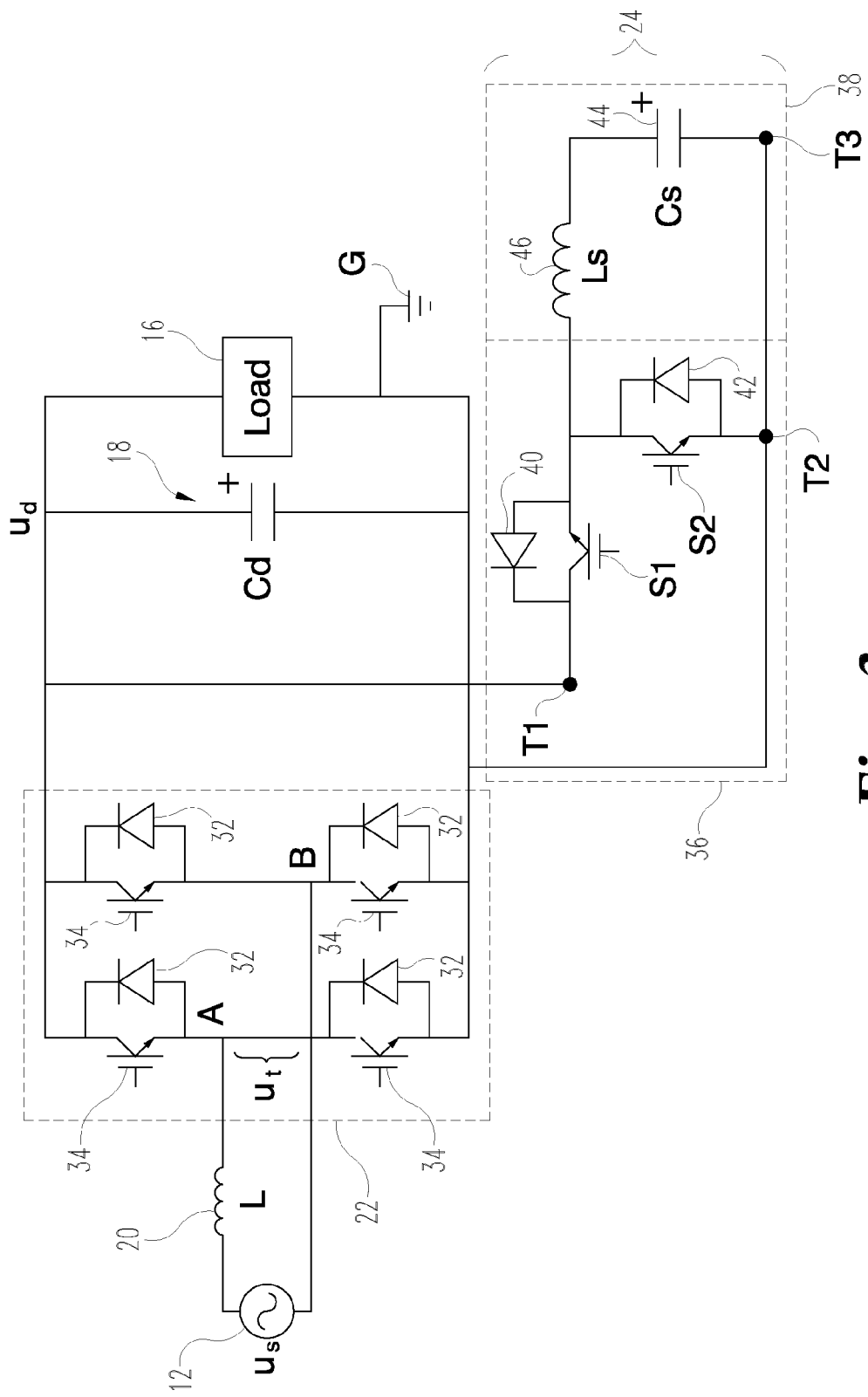
FIG. 3 is a schematic view illustrating an embodiment of an auxiliary bidirectional buck-boost converter and auxiliary storage system of an active ripple energy storage system employed in conjunction with the PWM rectifier circuit of FIG. 2.

Referring now to FIG. 3, active ripple energy storage circuit 24 of the present embodiment includes an auxiliary bidirectional buck-boost converter 36 and an auxiliary storage system 38. Active ripple energy storage circuit 24 terminates at a terminal T1, a terminal T2 and a terminal T3. In one form, active ripple energy storage circuit 24 is coupled in parallel to electrical load 16, primary PWM rectifier circuit 22, and DC link capacitor 18 via terminal T1 and terminal T2, the latter of which is ground G. Terminal T3 is coupled to terminal T2. Active ripple energy storage circuit 24 is configured to selectively absorb and discharge at least a part of the ripple energy.

Auxiliary bidirectional buck-boost converter 36 includes a semiconductor switch S1, a semiconductor switch S2, a diode 40 and a freewheeling diode 42. Semiconductor switches S1 and S2 are connected in series with each other, and are connected in parallel to primary PWM rectifier circuit 22, for example as an additional branch of primary PWM rectifier circuit 22, e.g., as an additional phase branch.

Diode 40 may be connected in parallel to semiconductor switch 51, and freewheeling diode 42 is connected in parallel to semiconductor switch S2. Auxiliary bidirectional buck-boost converter 36 is configured to selectively direct the ripple energy to and from auxiliary storage system 38.

In one form, auxiliary bidirectional buck-boost converter 36 is integrated as an additional branch of PWM rectifier 14. It is alternatively considered that in other embodiments, auxiliary bidirectional buck-boost converter 36 may be coupled to PWM rectifier 14 in any other suitable fashion. In addition, although active ripple energy storage circuit 24 employs a bidirectional buck-boost converter, it will be understood by those skilled in the art that other forms of an active ripple energy storage circuit may be employed in other embodiments of the present invention.

Auxiliary storage system 38 may include an auxiliary capacitor 44 and an auxiliary inductor 46, which may be connected between semiconductor switches S1 and S2 and ground G. Auxiliary storage system 38 is configured to selectively absorb and discharge at least a part of the ripple energy. In one form, auxiliary inductor 46 is configured to transfer the ripple energy to and from auxiliary capacitor 44; auxiliary capacitor 44, on the other hand, is configured as a storage element for use in storing the ripple energy for later provision to the electrical load, and may be configured to absorb, store and discharge the ripple energy. It is alternatively contemplated that in other embodiments, an inductor may be used as the storage element instead of or in addition to auxiliary capacitor 44, although the increase in power density of the PWM rectifier may not be as pronounced as where the ripple energy is stored in a capacitor.

Figure 4:
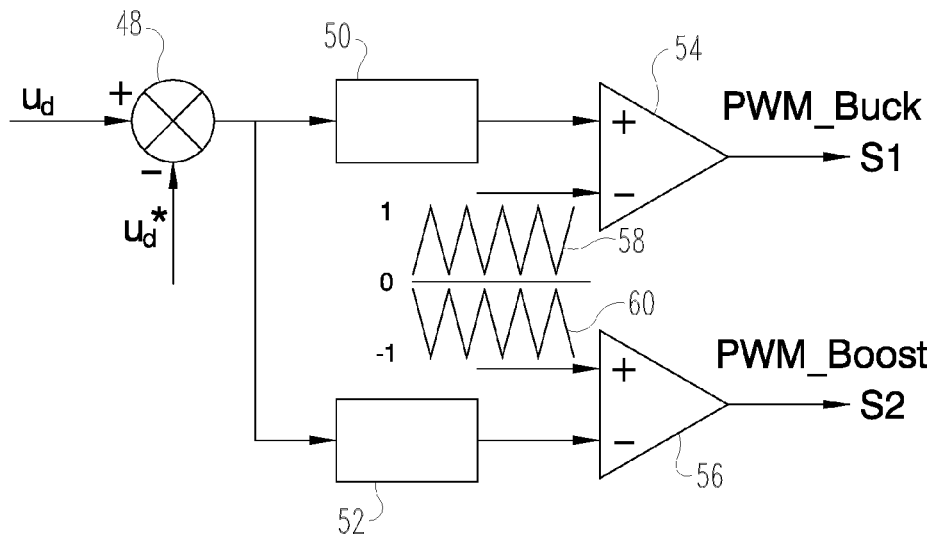
FIG. 4 is a schematic view of an embodiment of a control circuit for the auxiliary bidirectional buck-boost converter illustrated in FIG. 3.

Referring now to FIG. 4, in one form, PWM control circuit 26 is a closed loop feedback system configured to direct the operations of active ripple energy storage circuit 24 so as to selectively absorb and discharge the ripple energy. PWM control circuit 26 directs active ripple energy storage circuit 24 to absorb and discharge the ripple energy based on comparing an actual voltage $U_d$ across electrical load 16 with a desired voltage $U_d^*$ across electrical load 16, e.g., a reference voltage. In one form, PWM control circuit 26 includes a difference generator 48, a first controller 50, a second controller 52, a buck comparator 54, and a boost comparator 56, although other configurations may be employed in other embodiments. Difference generator 48 may determine a difference signal based on load voltage $U_d$ and reference voltage $U_d^*$.

The difference signal output by difference generator 48 is received by each of controller 50 and controller 52, each of which provide an output to a respective of buck comparator 54 and boost comparator 56. Other inputs to buck comparator 54 and boost comparator 56 include a PWM signal 58 and a PWM signal 60 received from a PWM signal source (not shown). Buck comparator 54 and boost comparator 56 are configured to compare the output of controller 50 and controller 52, respectively, with PWM signal 58 and PWM signal 60, respectively, and to provide based thereon a PWM buck signal and a PWM boost signal to control the operation of buck-boost converter 36. In the present embodiment, controllers 50 and 52 are proportional-integral controllers, although other types of controllers may be employed without departing from the scope of the present invention.

The output of buck comparator 54 is coupled to switch 51, and the output of boost comparator 56 is coupled to switch S2. During operation, PWM control circuit 26 controls semiconductor switches S1 and S2 to selectively direct ripple energy to and from auxiliary capacitor 44, via auxiliary inductor 46, based on the difference signal output by difference generator 48, and based on PWM signal 58 and PWM signal 60. Thus, with embodiments of the present invention, ripple energy is stored in the auxiliary capacitor 44, which may reduce or eliminate the need to store ripple energy in DC link capacitor 18. Storing the ripple energy in auxiliary capacitor 44 may be more effective than storing the ripple energy in DC link capacitor 18, because the voltage in auxiliary capacitor 44 is not limited by the allowable voltage range of the DC bus or load 16, which means that auxiliary capacitor 44 can be charged and discharged within a large range, e.g. a large voltage range. Thus, when energy needs to be stored from the DC bus, e.g. at voltage $U_d$, to the auxiliary capacitor 44, switch 51 and free wheeling diode 42, which form a buck converter, charge the ripple energy to auxiliary capacitor 44. On the other hand, when releasing the ripple energy from auxiliary capacitor 44 to the DC bus, switch S2 and diode 40, which form a boost converter, discharge the ripple energy from auxiliary capacitor 44 into the DC bus.

In order to minimize the size of the DC link capacitor 18, e.g., so as to increase the power density of the PWM rectifier, it may be desirable to optimize the size of auxiliary capacitor 44. One way of determining the optimum size of auxiliary capacitor 44 may be described as follows.

Given the assumption that the AC supply voltage and current are sinusoidal, they may be expressed as set forth in equations 1 and 2, below, $$U_s(t) = U_s \sin \omega t \qquad \text{(Equation 1)}$$

$$I_s(t) = I_s \sin(\omega t - \phi) \qquad \text{(Equation 2)}$$

where $\phi$ is the angle between the supply voltage and current, and $\omega$ is the supply angular frequency.

The instantaneous power of the rectifier after the input inductor may be expressed as Equation 3:

$$P_s = \frac{U_s I_s}{2} \cos\varphi - \left( \begin{array}{c} \frac{U_s I_s}{2} \cos(2\omega t - \varphi) + \\ \omega L I_s^2 \sin(\omega t - \varphi)\cos(\omega t - \varphi) \end{array} \right) \qquad \text{(Equation 3)}$$

where $P_s$ is the instantaneous power output by the rectifier circuit; L is the inductance of the input inductor; $U_s$ is the voltage at the rectifier circuit, and $I_s$ is the current output by the rectifier circuit.

Equation 3 illustrates that the instantaneous power consists of two parts: the average power and the ripple power. For purposes of analysis, the average power may be considered to be a constant power source that supplies the electrical load, while the ripple power may be considered to be an oscillating power source that comes from the AC side. By employing ripple power, the ripple energy may be calculated by Equation 4, below.

$$E_r = \frac{\sqrt{P_o^2 + \left(\frac{2\omega L P_o^2}{U_s^2 \cos^2\varphi} - P_o \frac{\sin\varphi}{\cos\varphi}\right)^2}}{\omega} \qquad \text{(Equation 4)}$$

where $E_r$ is the ripple energy and $P_o$ is the output power.

Equation 4 illustrates the relationship between the ripple energy, the output power, the AC input voltage, the AC frequency, the input inductor, and the input power factor.

Figure 5:
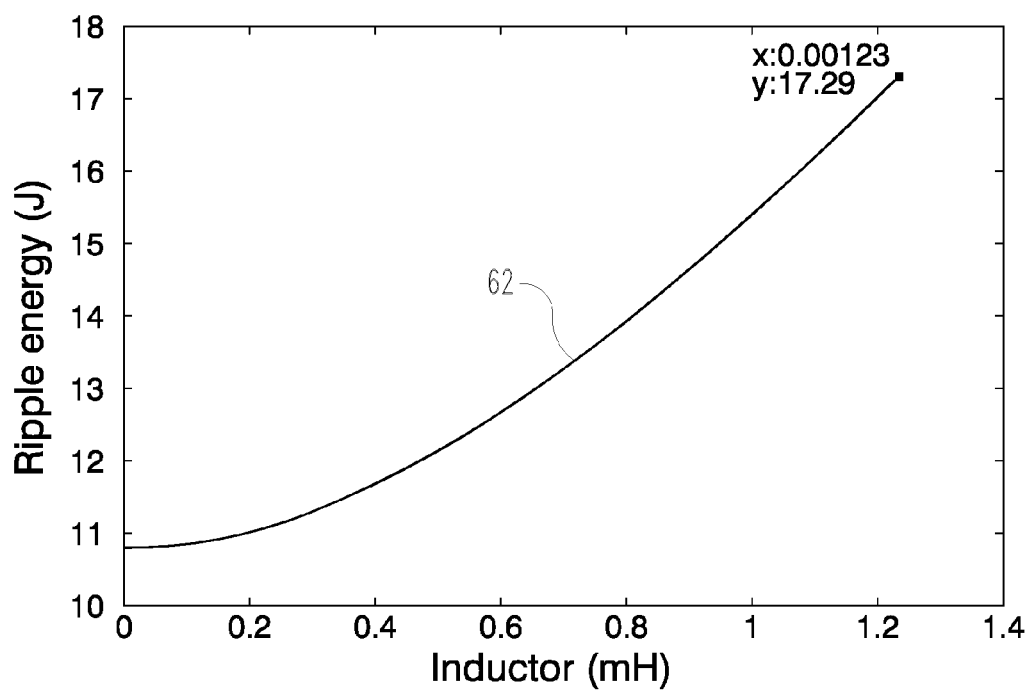
FIG. 5 is a plot illustrating the relationship between ripple energy and an input inductor inductance.

Referring now to FIG. 5, for a given frequency and at unity power factor, a relationship 62 between the input inductor inductance and the ripple energy is depicted. Relationship 62, which is based on equation 4, illustrates that more ripple energy is generated with increasing input inductor inductance, which may be considered a trade off between the ripple energy and AC current harmonics. As the amount of ripple energy increases, the size of its storage system also increases.

Generally, at a given voltage rating, the selection of the energy storage capacitor may be based on two aspects: capacitance and current rating. When charging a capacitor, its voltage may increase from the capacitor's minimum value to the maximum value, and on the other hand, when discharging a capacitor, its voltage may decrease from the maximum value to the minimum value. The average voltage of the capacitor may be expressed as $U_{da}$ and the peak value of the ripple voltage may be expressed as $\Delta U_{da}$.

The most efficient way to store the ripple energy may be by completely charging and discharging the capacitor, which means that $U_{da} = \Delta U_{da}$. With this optimum condition, the energy stored in the capacitor may be expressed as Equation 5, and the low harmonic current in this capacitor may be expressed as Equation 6, below.

$$E_r = \frac{1}{2} C (2 \cdot U_{da})^2 \qquad \text{(Equation 5)}$$

$$I_{rms} = \frac{C \cdot U_{da} \cdot \omega}{\sqrt{2}} \qquad \text{(Equation 6)}$$

In order to address potential reliability and insulation concerns, the peak value of the energy storage capacitor's voltage may set be lower than the DC bus voltage in some embodiments, although higher voltages may alternatively be employed in other embodiments.

In any event, Equations 4-6 may be employed to determine the energy storage capacity of active ripple energy storage circuit 24, in particular, the size of auxiliary capacitor 44 (and hence, auxiliary storage system 38) that is sufficient to absorb, store and discharge the ripple energy. The storage capacity is configured based at least in part on the ripple energy received from primary PWM rectifier circuit 22 and AC power source 12. The storage capacity may also be configured based on the inductance of input inductor 20, in particular, at unity power factor, e.g., since the input inductor's inductance is relevant to the amount of ripple energy that is generated by the system. In addition, the storage capacity may be configured based on the voltage, current and frequency of the AC power source, which are also relevant to the amount of ripple energy generated by the system.

During the operation of electrical power system 10, PWM control circuit 26 operates in a discontinuous mode to direct the activities of auxiliary bidirectional buck boost converter 36 as required to direct ripple energy into and out of auxiliary storage system 38, in particular, auxiliary capacitor 44, in order to reduce the amount of ripple energy transmitted across the DC bus to electrical load 16. For example, in one form, PWM control circuit 26 employs the difference signal generated by difference generator 48 and PWM signals 58 and 60 to direct auxiliary bidirectional buck-boost converter 36 to operate in the buck phase when ripple energy is to be received from the DC bus and stored in auxiliary capacitor 44. In such an embodiment, PWM control circuit 26 would also employ the difference signal generated by difference generator 48 and PWM signals 58 and 60 to direct auxiliary bidirectional buck-boost converter 36 to operate in the boost phase when ripple energy is to be released or discharged from auxiliary capacitor 44 to the DC bus.

Thus, in one form, the ripple energy may be stored in auxiliary capacitor 44, as opposed to conventional PWM rectifier systems, wherein the ripple energy is stored in the DC link capacitor (DC bus capacitor), i.e., corresponding to DC link capacitor 18. Storing the ripple energy in auxiliary capacitor 44 may be much more effective than storing it in the DC link capacitor, because the auxiliary capacitor is not limited by the DC bus voltage requirements, and hence may be able to be charged and discharged over a much wider voltage range than is permitted at the DC bus. Accordingly, the size of the DC link capacitor may be reduced. Simulations and experiments have shown that with embodiments of the present invention, the reduction in capacitance may yield the result that the combined sizes of auxiliary capacitor 44 and DC link capacitor 18 are smaller than a system having the same AC power source, electrical load characteristics and PWM rectifier circuitry as electrical power system 10, but not having active ripple energy storage circuit 24 and PWM control circuit 26.

For example, in one simulation, in order to absorb the ripple energy at a voltage varying between 530V and 550V in the absence of the present invention, a capacitor having a capacitance of 1600 µF and a 33 A (rms) low frequency $2^{nd}$ order current rating was required, whereas with an embodiment of the present invention, a capacitance of 120 µF and a current rating of 65.8 A (rms) low frequency $2^{nd}$ order harmonic was sufficient. In a physical experiment, similar results were achieved, i.e., a 200 µF capacitor, employed in accordance with an embodiment of the present invention, operating at a mean voltage of 540V was sufficient, whereas absent the active storage embodiment of the present invention set forth herein, a 1600 µF capacitor was required.

Because the capacitance required to store the ripple energy may be much lower in some embodiments of the present invention, the power density may be increased, and the current rating may also increase. For example, experimental results indicate that the volume of a system (including capacitor, heatsink, insulated gate bipolar transistor (IGBT) module, fans and inductor) that incorporates the present teachings may in some embodiments be 60% of a similar system having the same AC power source, electrical load characteristics and PWM rectifier circuitry, but lacking circuits such as active ripple energy storage circuit 24 and PWM control circuit 26.

Also, with certain embodiments of the present invention, due to the reduced capacitance, a film capacitor may be employed in place of larger and less reliable electrolytic capacitors. In some embodiments, a longer-life film capacitor may be used to achieve a longer life for PWM rectifier 14.

Thus, the power density of the system may be increased by incorporating the active ripple energy storage circuit using an auxiliary capacitor for ripple energy storage that operates no higher than DC bus voltage. In addition, as will be apparent to those skilled in the art, by virtue of the present disclosure, further increases in power density may be obtained by operating the auxiliary capacitor at peak voltages higher than the DC bus voltage.

Although the auxiliary capacitor may store the ripple energy output by primary PWM rectifier circuit 22, the DC link capacitor may be used to store the minority second harmonic ripple energy and high harmonic ripple energy partly from primary PWM rectifier circuit 22 and partly from auxiliary bidirectional buck-boost converter 36.

Accordingly, in view of the above, embodiments of the present invention may include, but are not limited to, an electrical power system for providing power to a direct current (DC) load. The electrical power system may include an alternating current (AC) power source configured to output an AC signal; a single phase pulse-width modulated (PWM) rectifier coupled to the AC power source and to the electrical load, the PWM rectifier being configured to receive the AC signal from the AC power source and to rectify the AC signal into a DC signal configured to operate the electrical load, wherein the DC signal includes a ripple component having a ripple energy; a DC link capacitor coupled in parallel to the load and the PWM rectifier; and an active ripple energy storage circuit having a first terminal, a second terminal and a third terminal. The active ripple energy storage circuit may be coupled in parallel to the electrical load, the PWM rectifier and the DC link capacitor via the first terminal and the second terminal; and the third terminal may be coupled to the second terminal. The active ripple energy storage circuit may be configured to selectively absorb and discharge at least part of the ripple energy. The PWM rectifier may be configured as an H-bridge rectifier.

The active ripple energy storage circuit may include an auxiliary storage system configured to store the at least part of the ripple energy, wherein the auxiliary storage system is positioned between the first terminal, the second terminal and the third terminal, and wherein the auxiliary storage system includes at least one of a capacitor and an inductor that is configured to store the ripple energy.

In one example, the auxiliary storage system may include an auxiliary capacitor and an auxiliary inductor, wherein the auxiliary inductor is configured to transfer the ripple energy to and from the capacitor, the capacitor being configured to absorb, store and discharge the ripple energy. In another example, the active ripple energy storage circuit may include an auxiliary bidirectional buck-boost converter configured to selectively direct the ripple energy to and from the auxiliary storage system, and the bidirectional buck-boost converter may be integrated as an additional branch of the PWM rectifier.

The electrical power system may also include a control circuit configured to direct the operations of the active ripple energy storage circuit in selectively absorbing and discharging the at least part of the ripple energy, and in one embodiment may be configured as a PWM control circuit. The control circuit may be a closed loop feedback system configured to direct the operations of the active ripple energy storage circuit based on comparing an actual voltage across the electrical load with a desired voltage across the electrical load.

The electrical power system may also include a PWM signal source configured to generate a PWM signal. The control circuit may include at least one controller and at least one comparator device: the at least one controller may be configured to receive as an input a difference signal pertaining to a voltage difference between an electrical load voltage and a reference voltage; the at least one comparator device may be configured to compare an output of the controller with the PWM signal; and the control circuit may be configured to selectively provide a PWM buck signal and a PWM boost signal based on the comparison. The at least one controller may be a proportional-integral controller.

The electrical power system may also include an input inductor, wherein the active ripple energy storage circuit may have an energy storage capacity, and wherein the energy storage capacity may be determined based upon the inductance of the input inductor, for example, at a unity power factor. In other embodiments, the input inductor may be the generator. Also, the active ripple energy storage circuit may include an auxiliary storage system having an energy storage capacity configured based upon the voltage, current and frequency of the AC signal from the AC power source.

In another embodiment of the present invention, a high-density pulse width modulated (PWM) rectifier may be coupled to an (AC) power source via an input inductor and may be configured rectify an AC signal received from the AC power source to supply a direct current (DC) signal to power an electrical load, wherein the DC signal includes a ripple component having a ripple energy. The PWM rectifier may be coupled in parallel to the electrical load, wherein a DC link capacitor having a capacitance requirement is also coupled in parallel to the electrical load. The high-density PWM rectifier may include a single phase primary PWM rectifier circuit configured to rectify the AC signal for providing DC power to operate the electrical load; and a ripple energy storage circuit coupled in parallel to the electrical load, the PWM rectifier and the DC link capacitor, the ripple energy storage circuit being configured to store at least part of the ripple energy to thereby reduce the capacitance requirement for the DC link capacitor. The ripple energy storage circuit may be an active circuit configured to selectively absorb and discharge at least part of the ripple energy, and a control circuit may be configured to direct the ripple energy storage circuit to the selectively absorb and the discharge the at least part of the ripple energy. The ripple energy storage circuit may be integrated as an additional branch of the primary PWM rectifier circuit. The load may be coupled to the electrical power system via a DC bus, and the auxiliary storage system may operate at a voltage limited by a DC bus voltage. The load may be coupled to the electrical power system via a DC bus, and wherein the auxiliary storage system may operate at a voltage that exceeds a DC bus voltage.

In yet another embodiment, a high-density pulse width modulated (PWM) rectifier configured to supply direct current (DC) power to an electrical load may include a single phase PWM rectifier circuit. The single phase PWM circuit may be configured to rectify an alternating current (AC) signal for providing the DC power to operate the electrical load, the single phase PWM rectifier circuit outputting a DC signal that includes a ripple component having a ripple energy. An auxiliary storage system may be coupled to the single phase rectifier circuit, and the auxiliary storage system may include at least one of an inductor and a capacitor configured to actively and selectively absorb and discharge at least part of the ripple energy from the single phase rectifier circuit. An auxiliary bidirectional buck-boost converter may be coupled to the auxiliary storage system and configured to selectively direct the ripple energy to and from the auxiliary storage system. A control circuit may be configured to direct the operations of the buck-boost converter in directing the ripple energy to and from the auxiliary storage system, and a DC-link capacitor configured to store a harmonic of the ripple energy, e.g., a minority and high frequency harmonic ripple energy.

The single phase PWM rectifier circuit may be configured as an H-bridge rectifier, and the DC link capacitor may be configured to store harmonic ripple energy from the PWM rectifier circuit and from the auxiliary bidirectional buck-boost converter.

In still another embodiment, a high-density pulse width modulated (PWM) rectifier configured to supply direct current (DC) power to an electrical load may include a single phase rectifier circuit configured to rectify an alternating current (AC) signal for providing the DC power to operate the electrical load, the rectifier circuit outputting a DC signal that includes a ripple component having a ripple energy; active means for selectively absorbing and discharging at least part of the ripple energy; and means for controlling the active means.

In yet still another embodiment, a high-density pulse width modulated (PWM) rectifier configured to supply direct current (DC) power to an electrical load includes a single phase rectifier circuit configured to rectify an alternating current (AC) signal for providing the DC power to operate the electrical load, the rectifier circuit outputting a DC signal that includes a ripple component having a ripple energy; active means for selectively absorbing and discharging at least part of the ripple energy; and means for controlling the active means.

In a further embodiment, a method for providing direct current (DC) power to an electrical load includes configuring an alternating current (AC) power source to output an AC signal; coupling a single phase pulse-width modulated (PWM) rectifier in parallel to the load; receiving at the PWM rectifier the AC signal; rectifying the AC signal with the PWM rectifier into a DC signal configured to operate the electrical load, the DC signal including a ripple component having a ripple energy; coupling an active ripple energy storage circuit in parallel to the electrical load; and selectively absorbing and discharging at least a part of the ripple energy using the active ripple energy storage circuit. In addition, wherein a DC link capacitor is coupled in parallel to the electrical load, the method includes absorbing a minority second harmonic of the ripple energy using the DC-link capacitor.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An electrical power system for providing direct current (DC) power to an electrical load, comprising:
    an alternating current (AC) power source configured to output an AC signal;
    a single phase pulse-width modulated (PWM) rectifier coupled to said AC power source and to said electrical load, said PWM rectifier being configured to receive said AC signal from said AC power source and to rectify said AC signal into a DC signal configured to operate said electrical load, wherein said DC signal includes a ripple component having a ripple energy;
    a DC link capacitor coupled in parallel to said load and said PWM rectifier; and
    an active ripple energy storage circuit having a first terminal, a second terminal and a third terminal, said active ripple energy storage circuit being coupled in parallel to said electrical load, said PWM rectifier and said DC link capacitor via said first terminal and said second terminal, said third terminal being coupled to said second terminal, said active ripple energy storage circuit being structured to selectively absorb and discharge at least part of said ripple energy,
    wherein said active ripple energy storage circuit includes an auxiliary storage system configured to store said at least part of said ripple energy;
    wherein said auxiliary storage system operates over a wider voltage range than the DC link capacitor; and wherein the active ripple energy storage circuit is configured to allow a reduced size of the DC link capacitor relative to a system not having the active ripple energy storage circuit.

2. The electrical power system of claim 1, further comprising means for storing at least part of said ripple energy.

3. The electrical power system of claim 1, wherein said PWM rectifier is configured as an H-bridge rectifier.

4. The electrical power system of claim 1, wherein said auxiliary storage system is positioned between said first terminal, said second terminal and said third terminal.

5. The electrical power system of claim 4, wherein said auxiliary storage system includes at least one of a capacitor and an inductor that is configured to store said ripple energy.

6. The electrical power system of claim 1, said auxiliary storage system including an auxiliary capacitor and an auxiliary inductor, wherein said auxiliary inductor is configured to transfer said ripple energy to and from said auxiliary capacitor, said auxiliary capacitor being configured to absorb, store and discharge said ripple energy.

7. The electrical power system of claim 1, wherein said active ripple energy storage circuit includes an auxiliary bidirectional buck-boost converter configured to selectively direct said ripple energy to and from said auxiliary storage system.

8. The electrical power system of claim 7, wherein said auxiliary bidirectional buck-boost converter is integrated as an additional branch of said PWM rectifier.

9. The electrical power system of claim 1, wherein said load is coupled to said electrical power system via a DC bus, and wherein said auxiliary storage system operates at a voltage limited by a DC bus voltage.

10. The electrical power system of claim 1, wherein said load is coupled to said electrical power system via a DC bus, and wherein said auxiliary storage system operates at a voltage that exceeds a DC bus voltage.

11. The electrical power system of claim 1, further comprising a control circuit configured to direct the operations of said active ripple energy storage circuit in selectively absorbing and discharging said at least part of said ripple energy.

12. The electrical power system of claim 11, wherein said control circuit is configured as a PWM control circuit.

13. The electrical power system of claim 11, wherein said control circuit is a closed loop feedback system configured to direct the operations of said active ripple energy storage circuit based on comparing an actual voltage across said electrical load with a desired voltage across said electrical load.

14. The electrical power system of claim 11, further comprising a PWM signal source configured to generate a PWM signal, wherein:
said control circuit includes at least one controller and at least one comparator device;
said at least one controller is configured to receive as an input a difference signal pertaining to a voltage difference between an electrical load voltage and a reference voltage;
said at least one comparator device is configured to compare an output of said at least one controller with said PWM signal; and
said control circuit is configured to selectively provide a PWM buck signal and a PWM boost signal based on the comparison.

15. The electrical power system of claim 14, wherein said at least one controller is a proportional-integral controller.

16. The electrical power system of claim 1, further comprising an input inductor, said active ripple energy storage circuit having an energy storage capacity, wherein said energy storage capacity is configured based upon the inductance of said input inductor.

17. The electrical power system of claim 16, wherein said energy storage capacity is configured based upon the inductance of said input inductor at a unity power factor.

18. The electrical power system of claim 16, wherein said AC power source is a generator, and wherein said input inductor is the self inductance said generator.

19. The electrical power system of claim 1, said active ripple energy storage circuit including an auxiliary storage system having an energy storage capacity configured based upon the voltage, current and frequency of said AC signal from said AC power source.

20. A high-density pulse width modulated (PWM) rectifier configured to power an electrical load, wherein a DC link capacitor having a capacitance requirement is coupled in parallel to said PWM rectifier, comprising:
a single phase primary PWM rectifier circuit configured to rectify an AC signal for providing DC power to operate an electrical load; and
a ripple energy storage circuit coupled in parallel to said electrical load, said PWM rectifier and said DC link capacitor, said ripple energy storage circuit being structured to store at least part of a ripple energy to reduce said capacitance requirement for said DC link capacitor,
wherein said active ripple energy storage circuit includes an auxiliary storage system configured to store said at least part of said ripple energy; and
wherein said auxiliary storage system operates over a wider voltage range than the DC link capacitor.

21. The PWM rectifier of claim 20, said ripple energy storage circuit being an active circuit configured to selectively absorb and discharge at least part of said ripple energy.

22. The PWM rectifier of claim 20, further comprising a control circuit configured to direct said ripple energy storage circuit to said selectively absorb and said discharge said at least part of said ripple energy.

23. The PWM rectifier of claim 20, wherein said ripple energy storage circuit is integrated as an additional phase branch of said primary PWM rectifier circuit.

24. A high-density pulse width modulated (PWM) rectifier configured to supply direct current (DC) power to an electrical load, comprising:
a single phase PWM rectifier circuit configured to rectify an alternating current (AC) signal for providing the DC power to operate the electrical load, said single phase PWM rectifier circuit outputting a DC signal that includes a ripple component having a ripple energy;
an auxiliary storage system coupled to said single phase PWM rectifier circuit, said auxiliary storage system having at least one of an inductor and a capacitor configured to actively and selectively absorb and discharge at least part of said ripple energy from said single phase PWM rectifier circuit;
an auxiliary bidirectional buck-boost converter coupled to said auxiliary storage system and configured to selectively direct said ripple energy to and from said auxiliary storage system;
a control circuit configured to direct the operations of said auxiliary bidirectional buck-boost converter in directing said ripple energy to and from said auxiliary storage system; and
a DC link capacitor configured to store a harmonic of said ripple energy,
wherein said auxiliary storage system operates over a wider voltage range than the DC link capacitor.

25. The PWM rectifier of claim 24, wherein said DC link capacitor is configured to only store ripple energy at $2^{nd}$ order harmonic and higher frequencies.

26. The PWM rectifier of claim 24, wherein said single phase PWM rectifier circuit is configured as an H-bridge rectifier.

27. The PWM rectifier of claim 26, wherein said DC link capacitor is configured to store harmonic ripple energy from said PWM rectifier circuit and from said auxiliary bidirectional buck-boost converter.

28. A high-density pulse width modulated (PWM) rectifier configured to supply direct current (DC) power to an electrical load, comprising:
    a single phase rectifier circuit configured to rectify an alternating current (AC) signal for providing the DC power to operate the electrical load, said rectifier circuit outputting a DC signal that includes a ripple component having a ripple energy;
    active means for selectively absorbing and discharging at least part of said ripple energy over a wider voltage range than the electrical load; and
    means for controlling said active means.

29. A method for providing direct current (DC) power to an electrical load, comprising:
    configuring an alternating current (AC) power source to output an AC signal;
    coupling a single phase pulse-width modulated (PWM) rectifier in parallel to said load;
    receiving at said PWM rectifier said AC signal;
    rectifying said AC signal with said PWM rectifier into a DC signal configured to operate the electrical load, said DC signal including a ripple component having a ripple energy;
    coupling an active ripple energy storage circuit in parallel to said electrical load; and
    selectively absorbing and discharging at least a part of said ripple energy using said active ripple energy storage circuit having an auxiliary storage system that operates over a wider voltage range than the electrical load.

30. The method of claim 29, wherein a DC link capacitor is coupled in parallel to said electrical load, further comprising absorbing a minority second harmonic of said ripple energy using said DC link capacitor.

* * * * *